UNITED STATES PATENT OFFICE.

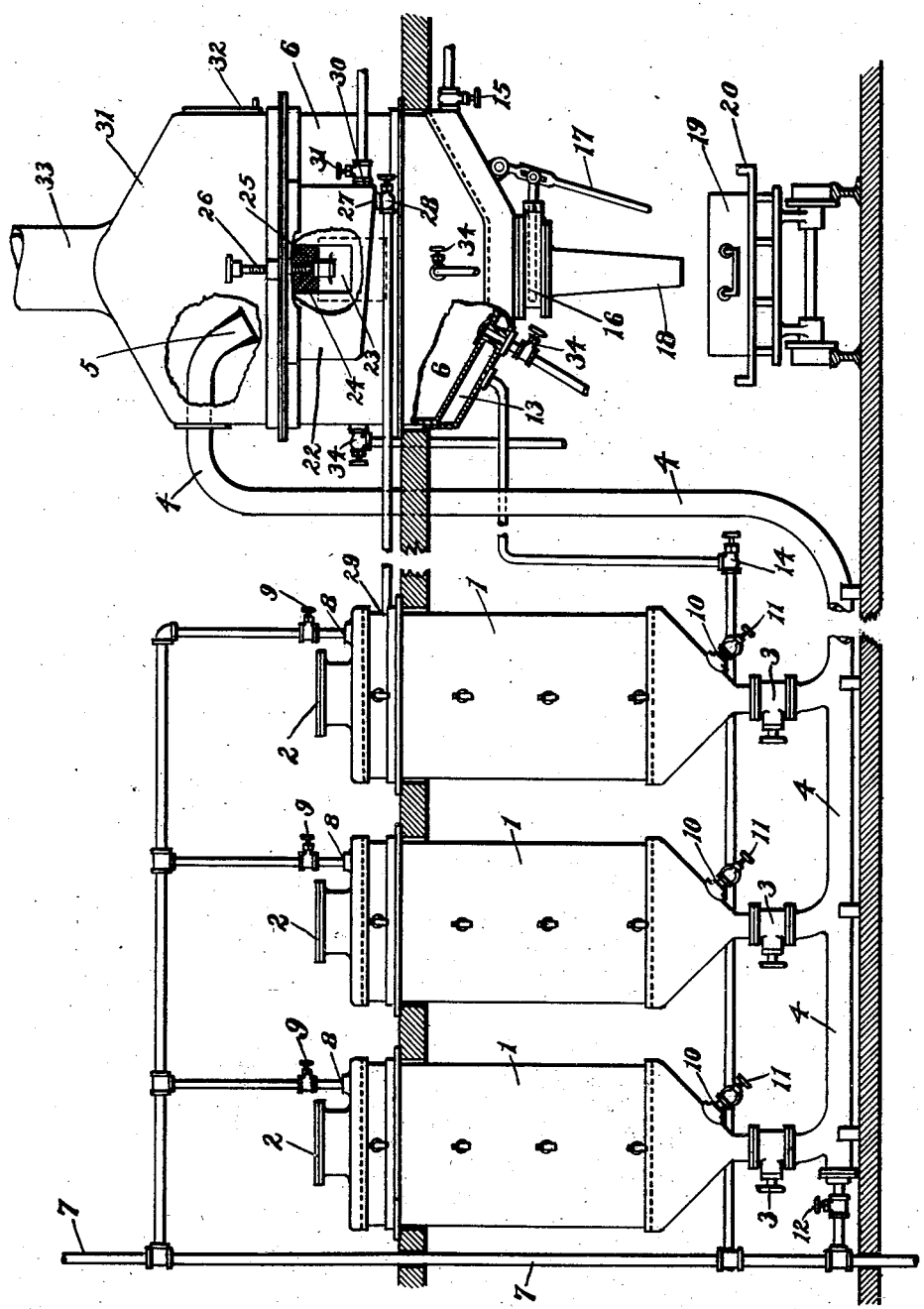

ALFRED H. ELDREDGE, OF MELROSE, MASSACHUSETTS, ASSIGNOR TO THE ALLBRIGHT-NELL COMPANY, OF CHICAGO, ILLINOIS, A CORPORATION OF ILLINOIS.

METHOD OF AND APPARATUS FOR HANDLING AND TREATING RENDERING-TANK RESIDUUM.

1,186,510.     Specification of Letters Patent.     Patented June 6, 1916.

Application filed December 4, 1913. Serial No. 804,766.

*To all whom it may concern:*

Be it known that I, ALFRED H. ELDREDGE, a citizen of the United States, residing at Melrose, in the county of Middlesex and State of Massachusetts, have invented a new and useful Method of and Apparatus for Handling and Treating Rendering-Tank Residuum, of which the following is a specification.

The object of my process and apparatus is to automatically convey the residuum from the rendering tank to a receiving tank, placed any desired distance away from the rendering tank and at any desired level, subjecting the residuum so conveyed, to a heating, softening, agitating and disintegrating treatment, delivering the same to the heated receiving tank with the oils, fats and greases, originally contained in the residuum, freed and separated from the solid matter of the same.

Another object is to provide a more sanitary and efficient method of handling residuum of rendering tanks, which treats animal matter from which edible products are produced.

Another object is to provide a method for treating rendering tank residuum in inclosed apparatus, which negatives the excessive discharge of noxious odors; thus freeing the plant from the same, and making it more sanitary and comfortable for the operators to work in.

Still another object is to provide a method of discharging rendered products from tanks in the quickest, most sanitary and efficient manner possible, as soon as the work of rendering and skimming of the tank has been completed, allowing the vessel to go back into service in the shortest possible time after the proper work of rendering has been done.

The present rendering tank practice, which is general throughout the country, either for edible or non-edible products, is first to cook the matter in the rendering tank, draw off the oils, and possibly some tank water; and then to drop the residuum of the tank into large, deep, wooden slush-boxes, which are set directly underneath the tank, for receiving the same. The residuum, thus dropped into the slush-boxes, is allowed to set for a while, and the grease or oil is then skimmed off from the top. (The grease or oils, thus skimmed, coming from edible tankage, is reclaimed for edible purposes.) Next, a portion of the tank-water is drawn from the same, and finally the solid matter is shoveled from the slush-box into boxes or cheeses, which are put on press cars and carted to the press room, where the same are set into presses under heavy pressure, for finally extracting and forcing the remaining oils or greases out from the solid matter. (Here again the grease or oil, thus obtained, coming from edible tankage, is reclaimed for edible purposes.)

The shoveling process, just mentioned, is most objectionable from a sanitary point of view, where edible matter is being treated, the same being carried out in the following manner:—The laborers with their dirty boots and clothing, attending to the same, are required to get into the slush-boxes, which are hot and steaming, and stand and walk around in the matter while shoveling the same into the cheeses,—making this process both unsanitary for the laborers, and unsanitary as to the product.

My process and apparatus overcome all such difficulties and unsanitary methods, and permit the handling of the residuum of a battery of rendering tanks as easily as that of a single tank, allowing the doing of all work automatically, and at the same time, proving far more efficient than the general practice heretofore described.

To the attainment of the foregoing and other useful ends, my invention consists in the matters hereinafter set forth as hereinafter claimed.

In the accompanying drawing I have shown a diagrammatic layout of a battery of three rendering tanks coupled to a common receiving tank by a common conductor-pipe (the receiving tank remote from the rendering-tanks and taking the place of the old type of wooden slush-boxes heretofore mentioned.)

Like numerals refer to like parts in the drawing.

The numeral 1 shows an ordinary type of rendering tank, used in common practice, having the cover plate 2 at the top, which may be removed from or fastened to the tank, when so desired. At the bottom of the tank 1 is the gate-valve 3 connected to a conduit or conveyer-pipe 4, which may be provided with an enlarged outlet 5 in the tankage or slush-box 6. The pipe 7 is a steam supply pipe communicating with the top of the tank 1 at 8, through the valve 9, and with the bottom of the tank 1, for cooking purposes, at 10, through the valve 11. The supply-pipe 7 also communicates with the conduit or conveyer-pipe 4, through the valve 12, for back-blowing or other purposes, and with the heating jacket 13 of the slush-box 6, through the valve 14; and has an outlet from said jacket through the valve 15. The tankage or slush-box 6, with its heating jacket 13 on the bottom, has an outlet through the valve-gate 16, which is operated by the shifting lever 17. The nozzle 18 guides the mass from the slush-box 6 (when the valve 16 is open) into the press-boxes or cheeses 19, which are set on the cars 20 to be carted to the presses for final treatment. The slush-box 6 is equipped with a conductor arrangement 22, which communicates with the interior of the slush-box 6, by means of the gate 23 set in the opening 24 which opening is provided with a screen or wire gauze 25, to permit only liquids to pass into the conductor 22 through the opening 24, when the gate 23 is open. The gate 23 is adjusted (raised or lowered) by means of the adjusting screw 26 to any desired level and permits the draining off of oils, fats, etc., from the top of the slush-box without disturbing the settled contents of the box. The conductor 22 is provided with an outlet 27 controlled by the valve 28, communicating with the tank 1 at 29 by means of which the oils, fats, etc., may be drained by gravity into the rendering tank 1, to be boiled or cooked over again, if desired; and another outlet 30, controlled by the valve 31, which may be connected with any receptacle for receiving the oils, fats or liquids extracted from the residuum, after heating in the slush-box 6. The tankage or slush-box 6 is provided with a hood 31, which is equipped with a hinged door 32 to permit skimming, if desired. The hood 31 is connected with a ventilating pipe 33 at the top, through which the hot steam and air rising from the box 6, is conducted to an air washer which purifies the same, and finally discharges it to the atmosphere.

Having thus described the apparatus used in connection with my process, I will first explain the method of cooking the animal matter originally deposited in the rendering tanks, the residuum of which my process deals with.

The valve 3 being closed, the rendering tank 1 is supplied with the proper quantity of hot water, after which the tank is charged with the animal matter to be treated, through the cover 2 in the top of the same, which cover, during the boiling process, is hermetically secured to the tank. Live steam is then injected at the bottom of the tank through the valve 11 and passes through the mass under treatment in the tank, resulting in setting up a circulation in the mass and also in agitating the particles of the same and thoroughly cooking the contents in the tank. The injection of the live steam, which acts on the mass, is kept up for the required time, depending upon the matter being treated and its condition, and results in relieving and liberating the oils or fats from the animal matter deposited in the tank and allows such oils or fats to rise in the tank, naturally above the water in the same,—the oils and fats in liquid form being lighter than the water and thus assuming a higher level than the water in the tank.

When the contents of the tank is thoroughly cooked, the steam is shut off and the tank is then drained by means of a series of draw-off cocks arranged at different levels, as indicated in the drawing, which are provided for the purpose and supplied with strainers inside of the tank at the orifices for preventing the cooked solid matter from passing through the cocks; thus the liberated oils or liquid fats and water which emanate during the cooking or rendering process, are drained from the tank, this being the usual and common method employed in rendering plants up to this point;—thereby leaving the mass, which consists of the cooked animal matter partly freed of its oils and fats, or the residuum, as I refer to it, which is then subjected to the treatment under my process.

After the animal matter, deposited in the rendering tank, has been cooked, and the oils and fats have been drained from the tank as above referred to, the residuum is left in the tank, the treatment and handling of which I will now describe as I claim it.

The residuum, in cases of edible animal rendering, for which my process is particularly intended, is found to be a gelatinous substance, full of meaty fiber and bones, tending to press into a compact and tenacious product.

Without draining the water in which the same was cooked, after the oils and fats have been drawn off, I open the gate-valve 3 and put on the live steam at the top of the tank, by manipulating the valve 9.

The pressure of the steam forces the residuum in the tank to enter the conveyer-pipe 4 and keeps the same moving in said pipe until it drops into the slush-box 6, which may be located anywhere in the plant at any desired level.

The matter which is thus being conveyed, as has already been said, after the first cooking process, is a gelatinous substance full of meaty fiber and bones, which, when it is not actually acted upon by the action of live steam coming into contact therewith, or when it is not immersed in hot water, has a natural tendency to press into a compact and tenacious mass. The same contains an appreciable percentage of fats and oils which were not liberated from the animal matter in the first cooking process: so that it must be understood that the application of the live steam subjected to the mass and penetrating it, as it may in my process, naturally furthers the cooking of the mass, and the forced motion of the same through inclosed channels, which retain the heat in the conveyed residuum, also results in the desired effect of further softening and expressing the remaining oils and fats in the solid matter. Also, because of the piercing action of the live steam which forces its way under pressure through the mass subjected to treatment in the comparatively small area of the conveyer-pipe, it will be understood that incidentally there tends to be a forcing of the marrow out of the bones in the residuum, to mingle with the rest of the oils and fats abstracted from the matter under treatment; it being understood that the marrow is not ordinarily freed from the bones in the first cooking process above referred to, and this when forced out and mixed with the other liberated fats and oils enriches the quality of the same and also increases the percentage of extraction. The result thus obtained in further cooking the mass along with the keeping of the same in motion, (the speed of which may be regulated according to the condition of the matter being treated by varying the pressure of live steam applied to the same) has every tendency to further soften the meat scraps and bones contained in the mass, and produces an effect on the same which is tantamount to subjecting it to a second simultaneous cooking and agitating process.

Only a moderate pressure of live steam is found necessary to be used in cooking and conveying the residuum through the conveyer-pipe, and the effect that it has on the residuum is far reaching. The residuum drops into the slush-box 6 wherever the same is located, with the oils and fats freed and separated from the solid matter;—the latter drops to the bottom of the slush-box, which contains hot water and is heated by means of the heating chamber 13, while the oils rise to the top of the level of the water in said slush-box, where the same may be skimmed or drained off.

After the residuum has been deposited in the receiving tank or slush-box 6, if necessary, water may be added for the purpose of bringing the level of the oils or fats in working range with the draining gate 23. The contents is heated and allowed to set. Then the oils or fats are drained or skimmed from the top, and the water is drained off by means of draw-off valves 34. The solid matter while hot is then dropped through the valve 16 into the cheeses 19 which are immediately set under the pressure of the press for finally extracting the remaining oils or fats in the solid matter.

From the foregoing description, it may thus be observed that my process affords a method of treating and handling rendering tank residuum which has many advantageous features over that of any other practice known in the art.

In my process, I convey the residuum great distances in closed constricted conduits and deliver it for further tank-treatment, and I maintain the heat and can deliver the final residuum, after the draining off of the liberated oils or fats and other liquids after the heating and setting process takes place in the slush box, to the press hot for the final extraction, with any desired degree of temperature, it being understood that the amount of oil recovered from the press depends not only upon the pressure, but also largely upon the temperature of the product being pressed.

It may be noted here that I have made several tests with various sizes of conveyer-pipes and have had no difficulty whatever, caused by the stopping-up of the conveyer-pipe. As a matter of fact, I have been able in one of my experiments to convey the residuum from non-edible hog rendering tanks (in which, with other products, a number of whole dead hogs have been dropped and cooked) through a two-inch conveyer-pipe. In any case I have had no trouble whatever in conveying the residuum through a four-inch conveyer-pipe to any desired height.

It must easily be apparent that the treatment to which the residuum is subjected under my process by the action of the live steam upon it, while in transit through the comparatively small section of the conveyer-pipe, must necessarily have a great effect on the same in the way of liberating and extracting the oils and greases from the solid matter, virtually combining two distinct operations, cooking and conveying, into one, the same being absolutely sanitary, efficient and automatic.

It must also be apparent that the possibility of heating the residuum deposited in the receiving tank or slush-box to any desired degree of temperature before the same is subjected to the pressure of the press, must result in bringing about the extraction of a greater percentage of oils and fats, etc. from the solid matter than is possible under the old method of handling the same (heretofore explained) in which method, from the time of dropping the residuum from the rendering tank, into the old wooden slush-boxes, to the time when the same is under the pressure of the press, it has every opportunity of becoming cooled; in which event, it becomes next to impossible to liberate the oils, etc., from the same.

Numerous tests under my process, have shown that there is but four per cent. and under of oils, etc., remaining in the final dried tankage (after being subjected to the pressure of the press) which is much less than one-half of what usually runs in the tankage, as handled by the present general practice, where the tank bottom or residuum is dropped to slush-boxes below the tank and then shoveled (a cooling process) to the press cheeses.

The automatic and confined conveying of the residuum from the rendering tanks is of special practical value and importance.

Having thus explained and outlined my process and apparatus in detail, I claim:—

1. A method of handling and treating rendering-tank residuum, which consists in forcibly driving such residuum in mass from such tank with live steam under pressure, and thence through closed, elongated and constricted conduits that confine the residuum and retain its heat and subject such conveyed residuum to a continued cooking and fat-expressing effect, and then further continuing such cooking in the slush-tank until the final residuum is drained and discharged hot into cheeses; substantially as specified.

2. A method of handling and treating rendering-tank residuum, which consists in forcibly driving such residuum in mass from such tank with live steam under pressure, and thence through closed, elongated and constricted conduits that confine the residuum and retain its heat and subject such conveyed residuum to a continued cooking and fat-expressing effect, then discharging said residuum into the slush-tank with reduced velocity, to reduce the disturbance of the inflow into the tank contents, and then further continuing the heating and cooking in the slush-tank until the final residuum is drained and discharged hot into cheeses; substantially as specified.

3. A method of handling and treating rendering-tank residuum, which consists in forcibly driving such residuum in mass from such tank with live steam under pressure, and thence through closed, elongated and constricted conduits that confine the residuum and retain its heat and subject such conveyed residuum to a continued cooking and fat-expressing effect, and then further continuing the heating and cooking in the slush-tank and draining and discharging the final residuum, still hot, into cheeses, and then subjecting such hot cheese-masses to pressure to express remaining fats; substantially as specified.

4. A method of handling and treating rendering-tank residuum, which consists in forcibly driving such residuum in mass from such tank with expansive fluid pressure, and thence through closed, elongated and constricted conduits that confine the residuum and retain its heat and subject such conveyed residuum to a continued cooking and fat-expressing effect, and then further continuing such cooking in the slush-tank until the final residuum is drained and discharged hot into cheeses; substantially as specified.

5. In an apparatus for handling and treating rendering-tank residuum, in combination: a rendering-tank adapted to have its contents subjected to steam pressure; means for supplying live steam thereto under pressure; a slush-tank remote from said rendering-tank; a pressure-tight discharge pipe forming a closed, elongated and constricted conduit leading from said rendering-tank to said slush-tank and adapted to convey the rendering-tank residuum to said slush-tank by the forcible driving action of the live steam pressure and to retain the heat in such confined and conveyed residuum and subject it to a continued cooking and fat-expressing effect; valves to control the rendering tank discharge into such pipe; means for heating the slush-tank contents; and means for draining and discharging the slush-tank final residuum into cheeses; substantially as specified.

6. In an apparatus for handling and treating rendering-tank residuum, in combination: a battery of rendering-tanks adapted to have their contents subjected to steam pressure; means for supplying live steam thereto under pressure; a slush-tank remote from said rendering-tanks; a pressure-tight discharge pipe forming a closed, elongated and constricted conduit with branches leading from said rendering-tanks in series and itself leading to said slush-tank and adapted to convey the collective rendering-tank residuum to said slush-tank by the forcible driving action of the live steam pressure and to retain the heat in such confined and conveyed residuum and subject it to a continued cooking and fat-expressing effect; valves to control the rendering-tank discharges into such pipe; means for heating the slush-tank contents; and means for draining and discharging the slush-tank final residuum into cheeses; substantially as specified.

7. In an apparatus for handling and treating rendering-tank residuum, in combination: a rendering-tank adapted to have its contents subjected to steam pressure; means for supplying live steam thereto under pressure; a slush-tank; a pressure-tight discharge pipe leading from said rendering-tank to said slush-tank and adapted to convey the rendering-tank residuum to said slush-tank by the forcible driving action of the live steam pressure, said pipe being provided with an expanding orifice to reduce the velocity of discharge of its contents into the contents of the slush-tank; valves to control the rendering-tank discharge into such pipe; means for heating the slush-tank contents; and means for draining and discharging the slush-tank final residuum into cheeses; substantially as specified.

8. In an apparatus for handling and treating rendering-tank residuum, in combination: a battery of rendering-tanks adapted to have their contents subjected to steam pressure; means for supplying live steam thereto under pressure; a slush-tank; a pressure-tight discharge pipe with branches leading from said rendering-tanks in series and itself leading to said slush-tank and adapted to convey the collective rendering-tank residuum to said slush-tank by the forcible driving action of the live steam pressure; valves to control the rendering-tank discharges into such pipe; an accessory steam-connection and valve leading directly into such pipe adjacent to the rendering-tanks; means for heating the slush-tank contents; and means for draining and discharging the slush-tank final residuum into cheeses; substantially as specified.

9. In an apparatus for handling and treating rendering-tank residuum, in combination: a rendering-tank adapted to have its contents subjected to expansive fluid pressure; means for supplying thereto such expansive fluid pressure; a slush-tank remote from said rendering-tank; a pressure-tight discharge pipe forming a closed, elongated and constricted conduit leading from said rendering-tank to said slush-tank and adapted to convey the rendering-tank residuum to said slush-tank by the forcible driving action of the aforesaid pressure and to retain the heat in such confined and conveyed residuum and subject it to a continued cooking and fat-expressing effect; valves to control the rendering tank discharge into such pipe; means for heating the slush-tank contents; and means for draining and discharging the slush-tank final residuum into cheeses; substantially as specified.

10. In an apparatus for handling and treating rendering-tank residuum, in combination: a battery of rendering-tanks adapted to have their contents subjected to expansive fluid pressure; means for supplying thereto such expansive fluid pressure; a slush-tank remote from said rendering-tanks; a pressure-tight discharge pipe forming a closed, elongated and constricted conduit with branches leading from said rendering-tanks in series and itself leading to said slush-tank and adapted to convey the collective rendering-tank residuum to said slush-tank by the forcible driving action of the aforesaid pressure and to retain the heat in each confined and conveyed residuum and subject it to a continued cooking and fat-expressing effect; valves to control the rendering-tank discharges into such pipe; means for heating the slush-tank contents; and means for draining and discharging the slush-tank final residuum into cheeses; substantially as specified.

11. In an apparatus for handling and treating rendering-tank residuum, in combination: a battery of rendering-tanks adapted to have their contents subjected to expansive fluid pressure; means for supplying thereto such expansive fluid pressure; a slush-tank; a pressure-tight discharge pipe with branches leading from said rendering-tanks in series and itself leading to said slush-tank and adapted to convey the collective rendering-tank residuum to said slush-tank by the forcible driving action of the aforesaid pressure; valves to control the rendering-tank discharges into such pipe; an accessory expansive fluid pressure connection and valve leading directly into such pipe adjacent to the rendering-tanks; means for heating the slush-tank contents; and means for draining and discharging the slush-tank final residuum into cheeses; substantially as specified.

ALFRED H. ELDREDGE.

Witnesses:
 BENJAMIN H. CHERTOK,
 R. LICHTENSTEIN.